US012290129B2

(12) United States Patent
Klimek et al.

(10) Patent No.: US 12,290,129 B2
(45) Date of Patent: May 6, 2025

(54) OUTER SHELL FOR A SAFETY HELMET

(71) Applicant: Schuberth GmbH, Magdeburg (DE)

(72) Inventors: Stephan Klimek, Magdeburg (DE); Sebastian Hofmann, Leipzig (DE); Markus Dohm, Lübars (DE); Philipp Lange, Magdeburg (DE)

(73) Assignee: Schuberth GmbH, Magdebrug (DE)

( * ) Notice: Subject to any disclaimer, the term of this patent is extended or adjusted under 35 U.S.C. 154(b) by 207 days.

(21) Appl. No.: 16/464,591

(22) PCT Filed: Nov. 28, 2017

(86) PCT No.: PCT/EP2017/080658
§ 371 (c)(1),
(2) Date: May 28, 2019

(87) PCT Pub. No.: WO2018/096172
PCT Pub. Date: May 31, 2018

(65) Prior Publication Data
US 2020/0037693 A1 Feb. 6, 2020

(30) Foreign Application Priority Data
Nov. 28, 2016 (DE) ..................... 10 2016 122 937.7

(51) Int. Cl.
*A42B 3/30* (2006.01)
*A42B 3/00* (2006.01)
(Continued)

(52) U.S. Cl.
CPC ................ *A42B 3/30* (2013.01); *A42B 3/003* (2013.01); *A42B 3/0433* (2013.01); *H01Q 1/276* (2013.01); *H01Q 1/42* (2013.01)

(58) Field of Classification Search
CPC ........... A42B 3/30; A42B 3/003; B29C 70/54; Y10T 249/946
See application file for complete search history.

(56) References Cited

U.S. PATENT DOCUMENTS 3,422,224 A 1/1969 Curran
3,470,558 A 9/1969 Raschke
(Continued)

FOREIGN PATENT DOCUMENTS

CN 2540799 Y 3/2003
CN 1627651 A 6/2005
(Continued)

OTHER PUBLICATIONS

D'Hooghe, E. L., and C. M. Edwards. "Thermoplastic Composite Technology; Tougher than You Think." Advanced Materials, vol. 12 , No. 23, 2000, pp. 1865-1868., https://doi.org/10.1002/1521-4095(200012)12:23<1865::aid-adma1865>3.0.co;2-n. (Year: 2000).*
(Continued)

*Primary Examiner* — Grace Huang
(74) *Attorney, Agent, or Firm* — McCarter & English, LLP

(57) ABSTRACT

The invention relates to an outer shell for a safety helmet (1), in particular for a motorcycle safety helmet, for distributing impact forces, said outer shell having an outer shell material (2). The outer shell is characterized in that, on a side (3) having the outer shell material (2) of the outer shell, the outer shell has a cover (4) having the outer shell material (2) in order to hold an antenna (5) between the cover (4) and the side (3). The invention further relates to a safety helmet (1) having such an outer shell and to a method for producing such an outer shell.

22 Claims, 2 Drawing Sheets

(51) Int. Cl.

| | |
|---|---|
| *A42B 3/04* | (2006.01) |
| *H01Q 1/27* | (2006.01) |
| *H01Q 1/42* | (2006.01) |

(56) References Cited

U.S. PATENT DOCUMENTS 3,582,951 A * 6/1971 Altmayer ................. A42B 3/30 343/726
3,885,246 A * 5/1975 Tung ...................... A42B 3/061 359/518
3,963,917 A 6/1976 Romano
3,977,003 A 8/1976 Kershaw
4,077,007 A 2/1978 McKinney
4,109,105 A 8/1978 Von Statten, Jr.
4,130,803 A 12/1978 Thompson
4,152,553 A * 5/1979 White ...................... A42B 3/30 379/430
4,178,411 A * 12/1979 Cole ......................... B32B 5/16 264/45.3
4,239,106 A * 12/1980 Aileo ..................... A42C 2/007 2/909
4,321,433 A * 3/1982 King ........................ A42B 3/30 455/344
4,357,711 A 11/1982 Drefko et al.
4,400,591 A 8/1983 Jennings et al.
4,466,138 A * 8/1984 Gessalin ................. B29C 70/68 2/410
4,519,099 A 5/1985 Kamiya et al.
4,563,392 A * 1/1986 Harpell ............... D06M 15/227 428/394
4,719,462 A * 1/1988 Hawkins .............. A42B 3/0433 342/20
4,729,132 A 3/1988 Fierro
4,833,726 A * 5/1989 Shinoda ................... A42B 3/30 455/90.3
4,903,350 A 2/1990 Gentes et al.
4,950,439 A * 8/1990 Smith ................... B29C 70/543 428/36.1
5,119,505 A 6/1992 Tisseront et al.
5,136,567 A 8/1992 Nagahara et al.
5,136,657 A 8/1992 Hattori
5,142,700 A * 8/1992 Reed ...................... H04B 1/385 455/344
5,183,701 A * 2/1993 Jacobs ................ D06M 10/025 427/538
5,291,203 A 3/1994 Schneck
5,327,588 A 7/1994 Garneau
5,329,637 A 7/1994 Walker
5,357,409 A * 10/1994 Glatt ...................... A42B 3/044 362/105
5,438,702 A * 8/1995 Jackson ................... A42B 3/30 2/422
5,448,780 A 9/1995 Gath
5,508,900 A 4/1996 Norman
5,615,410 A * 3/1997 DeMars ................. A42B 3/303 455/128
5,683,831 A 11/1997 Baril et al.
5,718,004 A 2/1998 Broersma et al.
5,743,621 A 4/1998 Mantha et al.
5,749,096 A * 5/1998 Fergason ................ A61F 9/067 2/412
5,862,528 A * 1/1999 Saijo ...................... A42B 3/124 2/425
5,886,667 A * 3/1999 Bondyopadhayay .. H01Q 21/24 343/718
5,931,559 A 8/1999 Pfaeffle
5,996,128 A 12/1999 Yanagihara
6,009,563 A 1/2000 Swanson et al.
6,081,929 A 7/2000 Rothrock et al.
6,336,220 B1 * 1/2002 Sacks ................... A43B 1/0009 428/116
6,464,369 B1 10/2002 Vega et al.
6,691,325 B1 2/2004 Pelletier et al.
6,701,537 B1 3/2004 Stamp
7,377,666 B1 5/2008 Tyler
7,532,163 B2 * 5/2009 Chang .................. H01Q 13/106 343/718
7,555,312 B2 6/2009 Kim et al.
7,555,788 B2 7/2009 Schimpf
7,901,104 B2 * 3/2011 McLean ................. A42B 3/044 362/106
8,001,623 B2 * 8/2011 Gertsch .................. A42B 3/042 2/410
8,009,229 B1 8/2011 Peterson
8,245,326 B1 8/2012 Tolve
8,544,399 B2 * 10/2013 Miloslavsky ............. B32B 5/26 112/475.18
8,545,959 B2 * 10/2013 McGuire, Jr. ........... B29C 70/44 428/220
8,667,617 B2 3/2014 Glezerman et al.
8,853,105 B2 * 10/2014 Bhatnagar ................. F41H 1/08 2/2.5
8,908,389 B2 12/2014 Teetzel et al.
9,070,978 B2 6/2015 Boni et al.
9,247,779 B1 2/2016 Aloumanis et al.
9,445,639 B1 9/2016 Aloumanis et al.
9,456,649 B2 10/2016 Basson
9,486,027 B2 11/2016 Dey et al.
9,585,433 B1 3/2017 Heimer et al.
9,686,136 B1 6/2017 Dey et al.
9,711,146 B1 7/2017 Cronin
9,833,933 B2 * 12/2017 Cadens Ballarin ... B29C 70/081
9,968,153 B2 5/2018 Thompson et al.
10,051,908 B2 8/2018 Redpath et al.
10,160,156 B2 * 12/2018 Pourboghrat ........... B29C 51/08
10,219,571 B1 3/2019 Aloumanis et al.
10,383,384 B2 8/2019 Zhavoronkov et al.
10,779,604 B2 9/2020 Lebel et al.
10,806,204 B2 10/2020 Pritz
10,814,524 B2 * 10/2020 Prins ....................... B29C 70/20
10,856,599 B1 12/2020 Cuenca
11,278,076 B2 * 3/2022 Suddaby ................ A42B 3/064
11,633,303 B2 * 4/2023 Persson ................... A61F 11/14 181/129
11,660,846 B2 * 5/2023 Drzal ........................ F41H 5/04 428/323
2005/0017911 A1 1/2005 Lee
2006/0232955 A1 10/2006 Labine
2006/0277664 A1 * 12/2006 Akhtar ..................... A42B 3/06 2/410
2007/0220662 A1 * 9/2007 Pierce ..................... B29C 44/12 2/410
2007/0289044 A1 12/2007 Ellis
2008/0068825 A1 3/2008 Harris
2008/0130271 A1 6/2008 Harris
2009/0064386 A1 3/2009 Rogers
2009/0158508 A1 6/2009 Quaranta et al.
2009/0199317 A1 * 8/2009 Schwiers ............. A42B 3/0433 2/5
2010/0175172 A1 7/2010 Dempsey et al.
2010/0287687 A1 11/2010 Ho
2011/0302701 A1 12/2011 Kuo
2012/0011631 A1 * 1/2012 Crossman ................ A42B 3/32 2/2.5
2012/0077438 A1 3/2012 Jung
2012/0189153 A1 7/2012 Kushnirov et al.
2012/0272435 A1 11/2012 Glezerman et al.
2013/0007949 A1 1/2013 Kurs et al.
2013/0081199 A1 4/2013 Nimura
2013/0176183 A1 * 7/2013 Boni ...................... H01Q 1/276 343/720
2013/0190052 A1 7/2013 Lundell
2013/0305437 A1 11/2013 Weller et al.
2014/0000013 A1 * 1/2014 Redpath ................. H05K 1/028 2/422
2014/0000014 A1 1/2014 Redpath et al.
2014/0020159 A1 1/2014 Teetzel et al.
2014/0109297 A1 4/2014 Lanez
2014/0189938 A1 * 7/2014 Redpath ............... A42B 3/0406 2/422
2014/0362244 A1 12/2014 Martin

(56) References Cited

U.S. PATENT DOCUMENTS

| | | | | |
|---|---|---|---|---|
| 2015/0038199 | A1 | 2/2015 | Shirashi | |
| 2015/0223547 | A1* | 8/2015 | Wibby | A42B 3/064<br>2/414 |
| 2015/0282549 | A1 | 10/2015 | Lebel et al. | |
| 2016/0100649 | A1 | 4/2016 | Glezerman et al. | |
| 2016/0106174 | A1* | 4/2016 | Chung | A42B 3/0433<br>340/539.13 |
| 2016/0249700 | A1 | 9/2016 | Zhavoronkov et al. | |
| 2017/0006955 | A1* | 1/2017 | Dow, II | A42B 3/10 |
| 2017/0052000 | A1* | 2/2017 | White | A42B 3/326 |
| 2017/0367433 | A1* | 12/2017 | Frett | F21V 23/02 |
| 2018/0221915 | A1* | 8/2018 | Simor | C08J 7/18 |
| 2018/0275928 | A1 | 9/2018 | Boksteyn | |
| 2018/0289095 | A1* | 10/2018 | Catterson | H04B 1/385 |
| 2019/0104797 | A1* | 4/2019 | Teetzel | A42B 3/04 |
| 2019/0191808 | A1 | 6/2019 | Becker et al. | |
| 2019/0269193 | A1 | 9/2019 | Benyola | |
| 2019/0320753 | A1 | 10/2019 | Le et al. | |
| 2019/0380417 | A1 | 12/2019 | Zhavoronkov et al. | |
| 2019/0387829 | A1* | 12/2019 | Becker | A42B 3/0493 |
| 2020/0015537 | A1 | 1/2020 | Becker et al. | |
| 2020/0305532 | A1 | 10/2020 | Lange et al. | |

FOREIGN PATENT DOCUMENTS

| | | | | |
|---|---|---|---|---|
| CN | 1715734 | A | 1/2006 | |
| CN | 201319192 | Y | 9/2009 | |
| CN | 102791157 | A | 11/2012 | |
| CN | 202919121 | U | 5/2013 | |
| CN | 104871384 | A | 8/2015 | |
| CN | 204949670 | U | 1/2016 | |
| CN | 205106513 | U | 3/2016 | |
| CN | 206043574 | U | 3/2017 | |
| CN | 106659261 | A | 5/2017 | |
| CN | 206312966 | U | 7/2017 | |
| CN | 206560075 | U | 10/2017 | |
| DE | 3042159 | A1 | 6/1982 | |
| DE | 8226935 | U1 | 2/1983 | |
| DE | 29519601 | U1 | 2/1996 | |
| DE | 29906107 | U1 | 7/1999 | |
| DE | 29914563 | U1 | 1/2000 | |
| DE | 102005038893 | A1 | 3/2006 | |
| DE | 202011051831 | U1 | 11/2011 | |
| DE | 102016122937 | A1 * | 11/2016 | |
| DE | 102015216835 | A1 | 3/2017 | |
| DE | 102017130373 | A1 * | 12/2017 | |
| DE | 102016115889 | A1 * | 3/2018 | A42B 3/0493 |
| EP | 0412205 | A1 | 2/1991 | |
| EP | 1393643 | A1 | 3/2004 | |
| EP | 2183989 | A1 | 5/2010 | |
| FR | 2335169 | A1 * | 7/1977 | A42B 3/06 |
| FR | 2668901 | A1 * | 5/1992 | A42B 3/06 |
| GB | 826012 | A * | 12/1959 | B29C 70/28 |
| GB | 974901 | A * | 11/1964 | H04B 1/088 |
| GB | 2059206 | A | 4/1981 | |
| GB | 2254528 | A * | 10/1992 | G01S 13/74 |
| JP | 01068507 | A * | 3/1989 | A42B 3/30 |
| JP | 2000328342 | A | 11/2000 | |
| JP | 2005060889 | A | 3/2005 | |
| JP | 2011-002958 | A | 1/2011 | |
| KR | 20010011095 | A | 2/2001 | |
| KR | 101530061 | B1 | 6/2015 | |
| WO | 2004032658 | A1 | 4/2004 | |
| WO | 2011129576 | A2 | 10/2011 | |
| WO | 2012006653 | A1 | 1/2012 | |
| WO | 2012017836 | A1 | 2/2012 | |
| WO | 2012148519 | A1 | 11/2012 | |
| WO | 2016001915 | A1 | 1/2016 | |
| WO | 2016022984 | A1 | 2/2016 | |
| WO | WO-2018043025 | A1 * | 3/2018 | C08B 37/0015 |

OTHER PUBLICATIONS

International Search Report for Application No. PCT/EP2017/080658, issued Feb. 23, 2018, 4 pages.

Written Opinion for Application No. PCT/EP2017/080658, issued Feb. 23, 2018, 5 pages.

Wikipedia, Wireless Personal Area Network, https://de.wikipedia.org/w/index.php?title=Wireless_Personal_Area_Network, printed Mar. 27, 2018, 4 pages.

Rajpurohit, A. "Fiber Reinforced Composites: Advances in Manufacturing Techniques.", Researchgate; https://www.researchgate.net/publication/279885386. (Year: 2014).

* cited by examiner

OUTER SHELL FOR A SAFETY HELMET

CROSS-REFERENCE TO RELATED APPLICATIONS

This application is a national stage application of international application no. PCT/EP2017/080658 filed Nov. 28, 2017, entitled "Outer Shell for a Safety Helmet," claiming priority to German application no. DE 10 2016 122 937.7, filed Nov. 28, 2016, which are hereby expressly incorporated by reference as part of the present disclosure.

FIELD OF THE INVENTION

The present disclosure generally relates to a safety helmet, such as a safety helmet having an outer shell, as well as a method for producing an outer shell for a safety helmet.

BACKGROUND

It is known from prior art that safety helmets and, in particular, motorcycle safety helmets have an outer shell for distributing impact forces. Such outer shells are used for the surface distribution of the impact forces along the outer shell. An inner layer that is regularly arranged within the outer shell then serves to dampen the impact forces distributed in this way. In addition to the primary safety aspect of such safety helmets, the digital communication of safety helmet wearers and, in particular, of motorcycle helmet wearers is becoming increasingly more important. Thereby, essential components of the corresponding communication devices can be arranged on the safety helmet or on the motorcycle helmet.

From prior art and, for example, from U.S. Pat. No. 8,667,617, it is known to arrange an antenna for the wireless communication on the inner layer in such a way that it is supported by the inner layer. This can, for example, take place by the antenna extending across the outer surface of the inner layer. The disadvantage of this approach lies in that a fixation of the antenna is not readily given. A gluing of the antenna or a similar measure is regularly required. It is also a disadvantage that, depending on the embodiment of the antenna, such an antenna made of a harder material than the inner layer can damage the inner layer over the long-term. However, also, such damage cannot be readily spotted and therefore, regularly remains unnoticed.

SUMMARY

It is therefore an objective to make an arrangement possible for an antenna on a safety helmet, which avoids the above-mentioned disadvantages.

The outer shell itself can be used for the fixation of the antenna by forming a cover for holding the antenna between the cover and one side of the outer shell. Thereby, the outer shell already has the material characteristics required for such a fixation and for holding due to its designated function. The hard and resistant material of the outer shell can also be used to separate the antenna from the softer inner layer. Thereby, an arrangement of the antenna on the outer side of the outer shell is also avoided.

The outer shell is can be for a safety helmet, for example, a motorcycle safety helmet, and is can be used to distribute impact forces. The outer shell has an outer shell material and, on one side having the outer shell material of the outer shell, the outer shell has a cover for holding an antenna between the cover and the side, wherein the cover has the outer shell material. The term "cover" should be understood to include a structure at least partially spaced away from the base surface of the side thereby forming an opening, where the held structure—here in this embodiment meaning the antenna—is arranged between a flat cover side of the cover and a flat base surface underneath the cover and may be fixed by arranging it between this cover side in this base surface. This base surface is a partial surface of the top side of the outer shell. This cover side essentially overlaps this base surface. As an alternative, it could also be shown that the antenna is held by an opening formed between the cover and the side of the outer shell.

In accordance with at least some embodiments of the outer shell, the side comprises an inner side of the outer shell. Thereby, the inner side of the outer shell is the concave side of the outer shell. In accordance with at least some embodiments of the outer shell, the side comprises an outer side of the outer shell. Accordingly, the outer side of the outer shell is the convex side of the outer shell. Thereby, the respective side of the outer shell apart from the cover is naturally intended.

In at least some embodiments of the outer shell, the outer shell material has a matrix material for a fiber composite material. Such a matrix material is used to bind the fibrous material of the fiber composite material to the matrix material by means of adhesive or cohesive forces. The matrix material surrounds the fibrous material of the fiber composite material. The above binding by means of adhesive or cohesive forces may be achieved in some embodiments by curing or cross-linking the matrix material, which can also be referred to as the process of compounding. Basically, the outer shell material can also comprise other materials in addition to the matrix material. However, it can also be that the outer shell material is essentially made of the matrix material. It can also be that the outer shell material comprises the fibrous material or is essentially made of this.

In at least some embodiments, the outer shell material comprises a fiber-reinforced plastic with the plastic as a matrix material and the fibrous material or is essentially even made of this fiber-reinforced plastic. In at least some embodiments, the fibrous material comprises glass fibers. Accordingly, the outer shell material then comprises such a glass-fiber-reinforced plastic or is essentially made of such. In the case of the fibrous material, it can also comprise an amount of different fibrous materials.

In at least some embodiments of the outer shell, the outer shell material and, in at least some embodiments, the matrix material, comprises a thermoset, e.g., a thermoset material. It can also be that the matrix material is essentially made of or consists essentially of the thermoset. In at least some embodiments, the thermoset comprises one or a plurality of substances from the group of vinyl ester resin (VE resin), epoxidacrylate, polyester resin (UP resin), epoxy resin, phenolic resin (PF resin), PVB-modified phenolic resin and styrene-free resin, including derivatives of these substances and of these substances with additives.

In accordance with at least some embodiments, the outer shell material and, in at least some embodiments, the matrix material, comprises a thermoplastic. It can also be that the matrix material is essentially made of the thermoplastic. In at least some embodiments, the thermoplastic comprises one or a plurality of substances from the group of acrylonitrile butadiene styrene (ABS), polyethylene (including HDPE and LDPE), polypropylene (PP), polycarbonate, polycarbonate with acrylonitrile butadiene styrene (PC+ABS), Polycarbonate with acrylonitrile butadiene acrylate (PC+ASA), polycarbonate with polyamide (PA) and polyether ether ketone (PEEK). The group also has derivatives of these substances as well as these substances with additives.

The cover can be constructed as a single piece with the remaining outer shell. The cover can also be firmly bonded to the remaining outer shell.

In at least some embodiments of the outer shell, the cover has an extension or extent, which essentially corresponds to the extension/extent of the antenna. Here, the extension may, in some embodiments, correspond to the extension of the hollow space formed by the cover, for example, between the cover and the base surface under the cover. The arrangement of the antenna between the cover and the side is essentially determined in this way. Furthermore, in at least some embodiments, the cover is set up to essentially completely hold the antenna between the cover and the side. So, if no part of the antenna is essentially located outside of the region of the cover, the separation between the antenna and, for example, an inner shell is essentially complete, which minimizes the risk of dislocation of the antenna or of reciprocal damage.

In accordance with at least some embodiments, the cover is open on two sides, which are, in at least some embodiments, located opposite to one another. Accordingly, the cover may define or form a passage between the cover and the side. As a result, it defines a tunnel-like structure for holding the antenna.

According to at least some embodiments, the cover forms a bag or pocket. In other words, the cover forms a bag-like structure closure for holding the antenna. In at least some embodiments of the outer shell, the bag is open in an opening direction-starting from the interior space of the bag—for inserting the antenna and is closed in an opposing direction towards the opening direction. Consequently, the antenna can only be inserted into the bag in a movement direction—this time starting from the outside of the bag—and can only be removed from the bag by means of a movement in the direction of opposing this movement direction. Guiding the antenna through the bag is therefore not possible. At least some such embodiments improve the fixation of the antenna in the bag. Furthermore, in at least some embodiments, the bag is closed on the inner side of the outer shell in the case of the transverse directions perpendicularly aligned towards the opening direction. Then, a guiding the antenna in or out in such a transverse direction is also ruled out. In at least some embodiments, it can be that a longitudinal extension of the bag along the opening direction exceeds a transverse extension of the bag along the transverse directions, but is less than the longitudinal extension of the inner layer. In this case, the bag has an elongated formation, which, in at least some embodiments, may be favorable if the antenna comprises an alignment and should also be arranged in a certain alignment towards the outer shell.

In accordance with at least some embodiments of the outer shell, the cover essentially extends along a surface of the side of the outer shell. In this way, the cover "follows" the course of the surface of the side, e.g., its curvature. Therefore, the cover may essentially follow a surface curvature of the surface of the side. Here, in at least some embodiments, the cover is set up to deform the held antenna according to the surface curvature and to affix the deformation under the cover.

The safety helmet, for example, a motorcycle safety helmet, has an outer shell and has an antenna held between the cover and the side, for example, for digital communication. The antenna can, in at least some embodiments, be set up for Bluetooth communication.

In at least some embodiments, the antenna is held between the cover and the side by a frictional connection. In the case of this frictional connection, in at least some embodiments, it can define a frictional connection that is based on a friction between the antenna and the cover. Here, it can furthermore be that the antenna is held between the cover and the side in an adhesive-bond-free manner. Consequently, the antenna is not glued in such embodiments between the cover and the side or fixed in a similar way. A comparably complex processing step for producing such an adhesive bond can be thus avoided.

Thereby, it is not required that the above friction results due to a direct contact between the antenna and the cover. Rather, it can be that, for example, a foil or another structure is respectively arranged between the cover and the antenna and between the side and the antenna. In the case of this foil or other structure, it can, for example, define a shaping means or a mold core, which, in the case of producing the outer shell, is used in the way described in detail further below to form the cover and which completely or partially remains between the cover and the side.

In at least some embodiments of the safety helmet, the antenna has a metallic antenna body and a plastic housing which may essentially completely hold the antenna body. Furthermore, the antenna may have an elongated shape, both with regard to its antenna body and also with regard to its plastic housing.

In at least some embodiments of the safety helmet, the antenna is held between the cover and the side in such a way that it can be pulled out in the opening direction.

In accordance with at least some embodiments of the safety helmet, the safety helmet has an inner layer held by the outer shell for dampening impact forces, that the safety helmet has an antenna feed line coupled with the antenna for connecting the antenna, and that the antenna feed line is at least partially arranged between the outer shell and the inner layer, e.g., part of the feed line is arranged therebetween. The antenna feed line is not necessarily used to send or receive radio signals, meaning it is not part of the antenna itself, but only establishes an electrical connection to the respective device which the antenna uses for sending and/or receiving. In principle, this device using the antenna can comprise any device connected to the safety helmet, for example either permanently or detachably connected thereto.

In at least some embodiments, this device comprises the communication device. At least some embodiments of the safety helmet have a contact assembly for the electrical connection to a communication device and that the antenna feed line is guided onto the contact assembly to connect the antenna.

At least some embodiments and features of the safety helmet correspond to at least some embodiments and features of the outer shell.

At least some embodiments relate to a method for producing an outer shell for a safety helmet, wherein the outer shell has an outer shell material.

In at least some embodiments, on one side of the preform with a first fibrous material, a cover layer is arranged with a second fibrous material. Basically, each fibrous material can comprise different various fibrous materials, however, in at least some embodiments, the first fibrous material is identical to the second fibrous material. The first fibrous material and the second fibrous material can then be simply referred to as fibrous material.

In at least some embodiments, between the side and the cover layer, a mold core is arranged, and a matrix material surrounding the first fibrous material of the preform and the second fibrous material of the cover layer is cured in order to form the outer shell so that, on the side, a cover of the outer shell having the outer shell material is formed to hold an antenna between the cover and the side. The outer shell material can comprise the matrix material, the first fibrous material or the second fibrous material or be essentially made of one or a plurality of these materials. In at least some embodiments, the outer shell material can comprise the matrix material as well as the first fibrous material and the second fibrous material. With reference to the order of the method steps, the mold core can also be arranged on the preform before the cover layer is arranged on the side of the preform.

In at least some embodiments, if the mold core is hollow or the like, it can remain at the point at which it was arranged. However, in at least some embodiments, the mold core is partially removed or completely removed after curing.

In at least some embodiments, the preform may form the outer shell without the cover. In other words, an extension of the preform essentially corresponds to an extension of the ultimately produced outer shell as a result.

In accordance with at least some embodiments, the preform is a prepreg preform comprising the matrix material and that, in addition or as an alternative, a cover layer is a prepreg cover layer comprising the matrix material. Here, it can be that, in the case of the preform or in the case of the cover layer, a compounding or curing has already partially taken place, for example, before arranging the cover layer on the side. In at least some embodiments, in the case of the preform, the first fibrous material and/or, in the case of the cover layer, the second fibrous material has—for example, only—been bound to the matrix material and the respective matrix material has only been partially cured.

Basically, the matrix material can be further cured in any way. However, in at least some embodiments, the matrix material is essentially cured by means of a hot pressing. In at least some embodiments, a substantially complete compounding takes place in the case of hot pressing so that the fibrous material of the preform and/or of the cover layer is only essentially completely bound to the matrix material only upon hot pressing. In at least some embodiments, a substance-to-substance connection between the first fibrous material of the preform and the second fibrous material of the cover layer also takes place using the matrix material by means of curing the matrix material.

In accordance with at least some embodiments, the matrix material is introduced as a liquid matrix material after arranging the cover layer on the inner side of the preform into the preform and into the cover layer so that a substance-to-substance connection between the cover layer and the preform is established. In accordance with at least some such embodiments, the liquid matrix material can comprises an artificial resin. In at least some embodiments, the matrix material is essentially inserted simultaneously into the preform and the cover layer. In this way, the matrix material can saturate the preform as well as the cover layer and also flow between these two structures during this process. This ensures reliable substance-to-substance connection between the cover layer and the preform during curing.

In embodiments having fiber-reinforced plastic, at least some embodiments comprise a glass-fiber-reinforced plastic. Accordingly, the first fibrous material and/or the second fibrous material can comprise glass fibers respectively.

In at least some embodiments, before arranging the cover layer, the mold core is glued to the side of the preform.

In at least some embodiments, after removing the mold core, the antenna is introduced into the pocket. As an alternative, the mold core can remain between the cover and the side and then, in at least some embodiments, the antenna can be introduced into the mold core.

At least some embodiments and features of the method correspond to at least some embodiments and features of the outer shell and of the safety helmet and vice versa. Thereby, in at least some embodiments, the side of the preform corresponds to the side of the outer shell and therefore, the determinations concerning the side of the outer shell analogously apply in the same way to the side of the preform.

This summary is not exhaustive of the scope of the present aspects and embodiments. Thus, while certain aspects and embodiments have been presented and/or outlined in this summary, it should be understood that the present aspects and embodiments are not limited to the aspects and embodiments in this summary. Indeed, other aspects and embodiments, which may be similar to and/or different from, the aspects and embodiments presented in this summary, will be apparent from the description, illustrations, and/or claims, which follow.

It should also be understood that any aspects and embodiments that are described in this summary and do not appear in the claims that follow are preserved for later presentation in this application or in one or more continuation patent applications.

BRIEF DESCRIPTION OF THE DRAWINGS

Other details, features, objectives and advantages are explained in the following description with reference to the Figures, which are understood not to be limiting.

DETAILED DESCRIPTION

Figure 1:
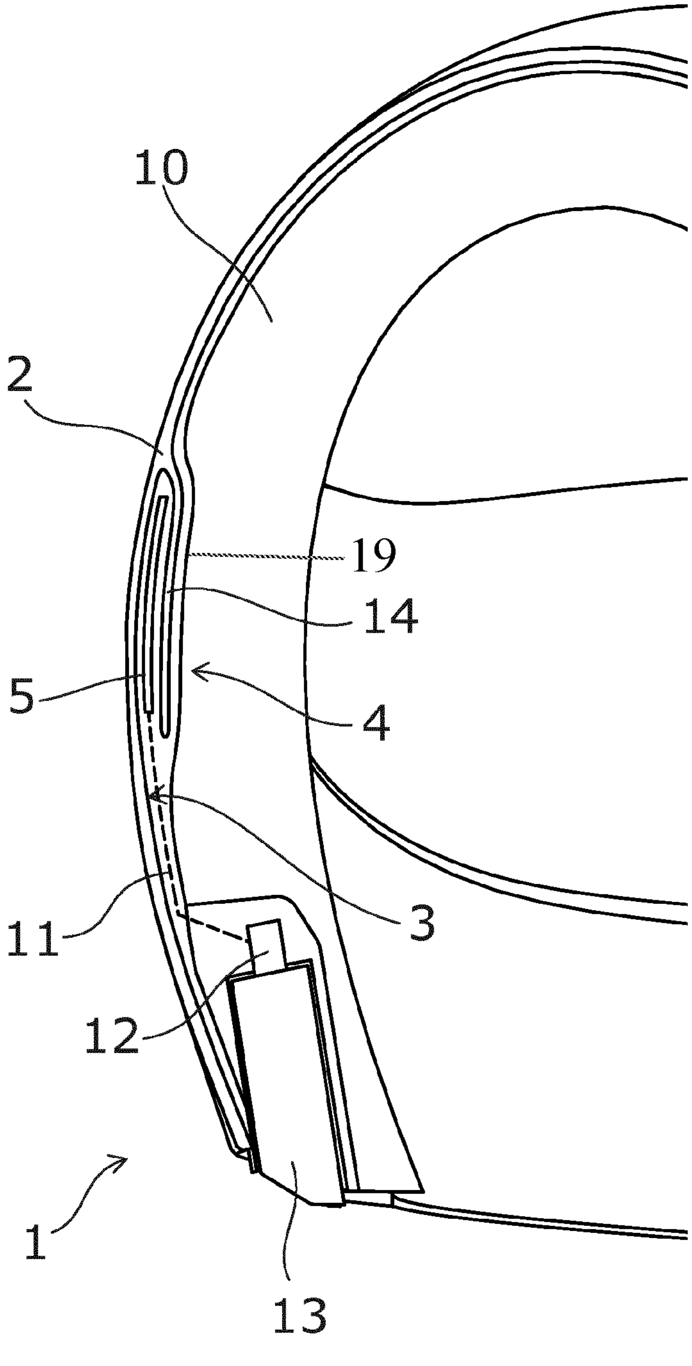
FIG. 1 is a partial sectional view of a safety helmet with an outer shell.
Figure 2:
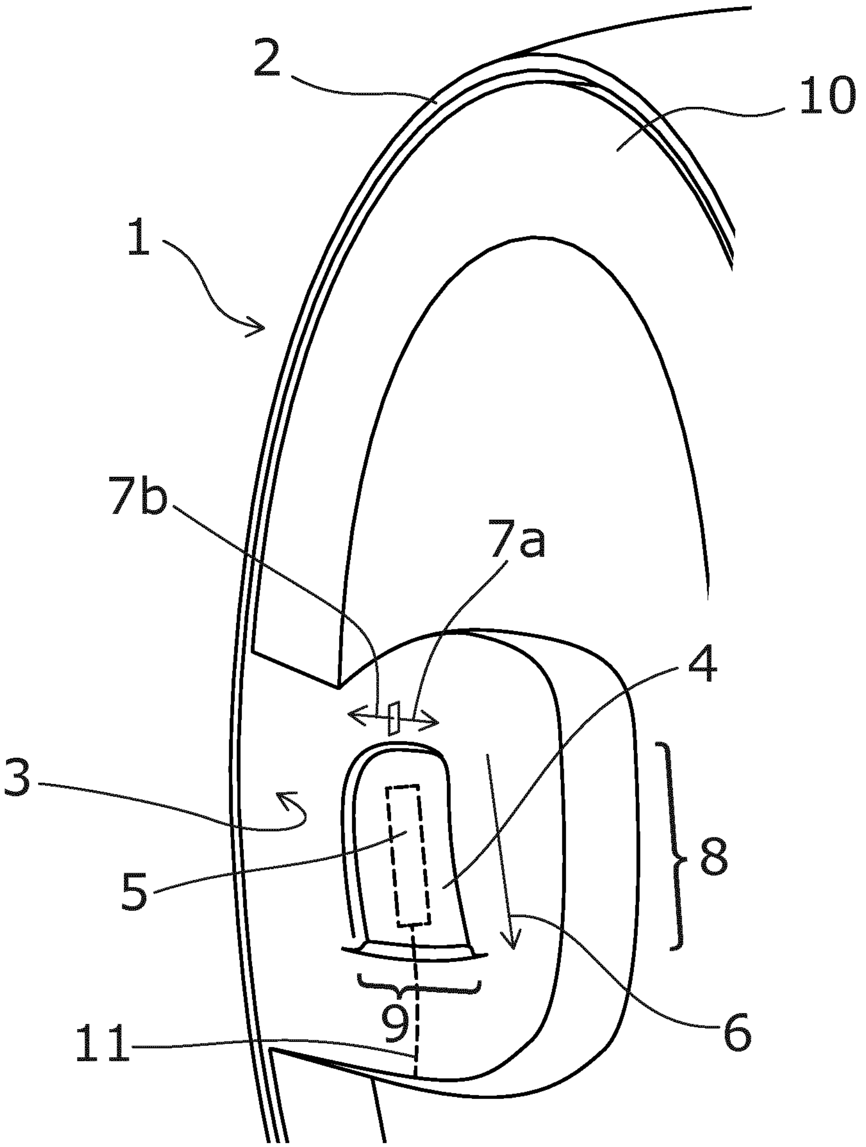
FIG. 2 is another perspective partial sectional view of the safety helmet in FIG. 1.

The outer shell in FIGS. 1 and 2 is an integral part of the safety helmet 1, which may form a motorcycle safety helmet. The outer shell is made of an outer shell material 2, for example, a glass-fiber-reinforced plastic. A side 3 of the outer shell for example, as shown here, an inner side of the outer shell—has a cover 4, which is made of the outer shell material 2 and which forms a pocket. In this pocket, in turn, an antenna 5 is arranged in such a way that it is fully covered by the cover 4, thereby being completely held by the pocket. In the case of this antenna 5, it may define an antenna 5 for digital communication, for example, an antenna 5 for Bluetooth communication.

The pocket is only open in one direction, namely the opening direction 6 shown in FIG. 2. In both transverse directions 7*a, b* and in a direction opposite the opening direction 6—i.e., in three directions—the pocket is closed. The elongated embodiment of the cover 4 and thereby, also the pocket, can be recognized by the fact that the longitudinal extension 8 of the cover 4 exceeds its transverse extension 9. The cover 4 extends along the surface of the side 3 and also follows the surface curvature of the surface of the side 3 caused by the rounding of the outer shell. The corresponding deformation of the antenna 5 by bending strengthens the friction between the antenna 5 and the cover 4, which, in turn, strengthens the corresponding frictional connection for holding the antenna 5 under the cover 4.

Furthermore, the safety helmet 1 has an inner layer 10, which, in at least some embodiments, is used to dampen impact forces due to its material characteristics. In the illustrated embodiment, the inner layer 10 defines a recess 19 configured to receive at least a portion of the cover 4, e.g., cover layer 14. Also, in the illustrated embodiment, at at least a portion of the inner layer, there is no outer shell material between at least a portion of the inner surface and a portion of the inner layer. An antenna feed line 11 of the safety helmet 1 in FIGS. 1 and 2, which extends between the outer shell and the inner layer 10 in the exemplary embodiment shown, is electrically connected to the antenna 5. The antenna feed line 11 is, as is shown in FIG. 1, received by a contact assembly 12. The contact assembly 12 establishes an electrical connection to a communication device 13. The communication device 13, in at least some embodiments, comprises a Bluetooth module for Bluetooth communication.

The outer shell of the safety helmet shown in FIGS. 1 and 2 was produced by a cover layer 14—which is shown in FIG. 1—made of glass fibers arranged on the side 3 of a preform—also made of glass fibers, wherein the preform corresponds to the outer shell without the above cover layer 14. The side 3 of the preform, which, in turn, corresponds to the inner side of the preform, also forms the corresponding side 3 of the then finished outer shell apart from the cover 4.

A mold core (not shown), the dimensions of which essentially correspond to those of the antenna 5, has been arranged between the preform and the cover layer 14. A resin material has been inserted as a liquid matrix material into a mold, into which the preform, the cover layer 14 and the mold core have been arranged, so that this matrix material surrounded the glass fibers of the preform and of the cover layer 14. Curing the matrix material caused a substance-to-substance connection between the glass fibers of the cover layer 14 and the glass fibers of the preform, wherein these glass fibers with the matrix material then form the outer shell material 2 of the outer shell. Then, the mold core is removed and the antenna 5 is placed between the resulting cover 4 and the side 3.

While the above describes certain embodiments, those skilled in the art should understand that the foregoing description is not intended to limit the spirit or scope of the present disclosure. It should also be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

The invention claimed is:

1. An outer shell for a safety helmet comprising an outer shell material and defining an inner surface of the outer shell comprising the outer shell material, an outer surface of the outer shell, and a cover adjacent said inner surface, the cover comprising the outer shell material, wherein the cover and the outer surface are located on opposite sides of the inner surface;

wherein the outer shell is configured to hold an antenna between the cover and the inner surface, wherein an inner layer is held by the outer shell and configured to dampen impact forces, wherein, at at least a portion of the inner layer, there is no outer shell material between at least a portion of the inner surface and said at least a portion of the inner layer, and wherein an antenna feed line is at least in part located between the inner surface and the inner layer and is coupleable with the antenna when the antenna is located between the cover and the inner surface.

2. The outer shell according to claim 1, wherein the outer shell material comprises a matrix material for a fibre composite material.

3. The outer shell according to claim 2, wherein the outer shell material comprises a fibre-reinforced plastic comprising the plastic as the matrix material and a fibrous material.

4. The outer shell according to claim 3, wherein the fibrous material comprises a glass fibre material.

5. The outer shell according to claim 2, wherein the matrix material comprises a thermoset.

6. The outer shell according to claim 5, wherein the matrix material consists essentially of a thermoset.

7. The outer shell according to claim 1, wherein the outer shell material comprises a thermoset.

8. The outer shell according to claim 1, wherein the outer shell material comprises a thermoplastic.

9. The outer shell according to claim 1, wherein the cover is configured to extend correspondingly to an extent of the antenna.

10. The outer shell according to claim 1, wherein the cover defines a pocket, which is open in an opening direction configured to receive the antenna therethrough and is closed in a direction opposite the opening direction.

11. The outer shell according to claim 10, wherein the pocket is located between the cover and the inner surface.

12. The outer shell according to claim 10, wherein a longitudinal extension of the pocket is less than a longitudinal extension of the inner layer.

13. The outer shell according claim 1, wherein the cover essentially extends along the inner surface of the outer shell.

14. The outer shell according to claim 1, wherein the safety helmet defines a motorcycle safety helmet for distributing impact forces.

15. The outer shell according to claim 1, wherein the inner layer defines a recess configured to receive at least a portion of the cover.

16. A safety helmet comprising:

an outer shell comprising an outer shell material and defining an inner surface of the outer shell comprising the outer shell material and an outer surface of the outer shell;

a cover adjacent said inner surface, the cover comprising the outer shell material, wherein the cover and the outer surface are located on opposite sides of the inner surface;

an antenna between the cover and the inner surface;

an inner layer held by the outer shell and configured to dampen impact forces; and an antenna feed line coupled with the antenna, wherein at least part of the antenna feed line is located between the inner surface of the outer shell and the inner layer;

wherein, at at least a portion of the inner layer, there is no outer shell material between at least a portion of the inner surface and said at least a portion of the inner layer.

17. The safety helmet according to claim 16, configured so that the antenna is removable from the safety helmet.

18. The safety helmet according to claim 16, wherein the safety helmet has a contact assembly configured to electrically connect to a communication device, and the antenna feed line is received by or on the contact assembly to operatively connect the antenna thereto.

19. The safety helmet according to claim 16, wherein no outer shell material is located between said at least part of the antenna feed line and the inner layer.

20. A method comprising:

producing an outer shell for a safety helmet, wherein the outer shell comprises an outer shell material and defines an inner surface of the outer shell comprising the outer shell material, an outer surface of the outer shell, and a cover adjacent said inner surface, the cover comprising the outer shell material, the cover and the outer surface are located on opposite sides of the inner surface;

the outer shell is configured to hold an antenna between the cover and the inner surface;

an inner layer is held by the outer shell and configured to dampen impact forces, wherein at at least a portion of the inner layer, there is no outer shell material between at least a portion of the inner surface and said at least a portion of the inner layer; and the outer shell includes an antenna feed line at least in part located between the inner surface and the inner layer and wherein the antenna feed line is coupleable with said antenna when said antenna is located between the cover and the inner surface, the method further including:

on a side of a preform comprising a fibrous material, locating a cover layer comprising the fibrous material, locating a mold core between the side of the preform and the cover layer, and curing a matrix material surrounding the fibrous material of the cover layer and thereby forming the outer shell and the cover, wherein the cover defines a pocket, which is open in said opening direction configured to receive an antenna therethrough and is closed in a direction opposite the opening direction.

21. The method according to claim 20, wherein one or more of the preform defines a prepreg preform comprising the matrix material and/or the cover layer defines a prepreg cover layer comprising the matrix material.

22. The method according to claim 20, further comprising, after the step of locating the cover layer on the side of the preform, introducing the matrix material as a liquid matrix material into the preform and into the cover layer and thereby establishing a substance-to-substance connection between the cover layer and the preform.

* * * * *